United States Patent [19]

Ye

[11] Patent Number: 5,410,306

[45] Date of Patent: Apr. 25, 1995

[54] CHINESE PHRASAL STEPCODE

[76] Inventor: Liana X. Ye, 640 Masonic Way, Belmont, Calif. 94002

[21] Appl. No.: 141,645

[22] Filed: Oct. 27, 1993

[51] Int. Cl.$^6$ ............................................ H03M 11/00
[52] U.S. Cl. ..................... 341/28; 400/110; 345/171; 341/22
[58] Field of Search ............. 341/22, 28; 400/109, 400/110, 484; 345/171, 172, 168

[56] References Cited

U.S. PATENT DOCUMENTS

| | | | |
|---|---|---|---|
| 4,379,288 | 4/1983 | Leung et al. | 341/28 |
| 4,500,872 | 2/1985 | Huang | 341/28 |
| 4,531,119 | 7/1985 | Nakayama et al. | 341/28 |
| 4,679,951 | 7/1987 | King et al. | 345/171 |
| 4,684,926 | 8/1987 | Wong | 341/28 |
| 4,868,913 | 9/1989 | Tse-Kai | 345/171 |
| 4,872,196 | 10/1989 | Royer et al. | 379/58 |
| 5,197,810 | 3/1993 | Zhang et al. | 400/484 |

OTHER PUBLICATIONS

The PINXXIEE Formula, 1991—Wen Tien.
The Natural Code, 1991—Zhinong, Zhou et al.
Cihai—Shanghai Cishu Publishing House, 1980.
A solution to the ideographic character identification Problem, 1989, George K. Kostopoulos.
A Dictionary of Chinese Character Information—Shanghai Transportation University & Shanghai Pinyin Research Institute, Science Publishing Company, Shanghai, 1988.
Xiandai Hanyu Cidian—Institute of Social Science, Academia Sinica, Shangwu Publishing House, Beijing, China, 1979.
Hanyu Da Zidian—Sichuan Cishu Publish House and Hubei Cishu Publish House, Chengdu, China, 1986.

Primary Examiner—Edward L. Coles, Sr.
Assistant Examiner—Fan Lee

[57] ABSTRACT

Depending on the size of the character sets, more steps may be designated with the same letters-followed-by-digits pattern. With the encoding system, an ideographic based language can be transcribed, or ciphered, into an easy-to-read stream of phonetic symbols and a discourse in the language can be input with commonly used computer keyboards. Since the system of encoding employs variable code length, it can be applied to much larger character sets by using longer codes. It also can be applied to character sets with different characteristics by appropriate reordering of the steps. The letters-followed-by-digits coding pattern is used for each characteristic of the ideographic symbols, independent of the symbols' relative graphic image locations in font tables and the size of character set, so that different configurations of the encoding can be software compatible across many character sets and languages.

6 Claims, 5 Drawing Sheets

| 0 | | Unspecified |
| 1 | — | Flat |
| 2 | ╱ | Rise |
| 3 | V | Dip |
| 4 | ╲ | Fall |
| 5 | ∧ | Entering |
| 6 | ~ | Trill |

四角号码笔形和代号

| 笔名 | | 号码 | 笔形 | 字 例 |
|---|---|---|---|---|
| 竺笔头 | | 0 | 亠 | 主病广言 |
| 单 | 横 | 1 | 一 | 天土 |
| | | | ノ 一 ヽ | 活培织凡风 |
| | 垂 | 2 | ｜ | 旧山 |
| | | | ノ ｜ | 千顺力则 |
| 笔 | 点 | 3 | 丶 | 宝社军外去亦 |
| | | | 丶 | 造瓜 |
| | 叉 | 4 | 十 | 古尊 |
| | | | 十 七 乂 彐 | 鸡式皮猪 |
| 复 | 串 | 5 | 丰 | 骨本 |
| | | | 扌 钅 手 | 打定察申夷 |
| | 方 | 6 | 口 | 男扣国甲由曲 |
| | | | 口 口 | 圆四 |
| | 角 | 7 | 𠃌 𠃍 𠃋 丁 | 刀写亡表 |
| | | | 厂 广 ⺁ | 阳兵叉雪 |
| | 八 | 8 | 八 | 分共 |
| 笔 | | | 人 入 ⺍ 丷 | 余央余羊午 |
| | 小 | 9 | 小 | 尖宗 |
| | | | 十个小⺌灬 | 快本暴当兴组 |

FIG. 4

| Radicals | Typical Stand-alone Radicals | Sample Characters |
|---|---|---|
| A 冂(冋)凵 | 四奥散 | 奥粵鹵向卑鬼身四凶卤熬 |
| B 丷勹宀广彡木 | 八巴白办半贝卑本匕币必卞鼻舁卜步 | 益关兼曾兹总首今包勺勿<br>鳖变弯恋叛比以旨疑 |
| C 艹彳巾巛宀 | 才曹册又产长厂车臣丞承尺斥赤春<br>虫丑川串刍寸 | 莩行萤崙甾粜常妻辰轧<br>尽蚯出 |
| D 亻夂疒穴厂髟凸 | 大歹丹刀氏电刁丁鼎丢东斗 | 隹务各处央象争角登癸辟<br>眉殷段所反斯奇奎邢殖 |
| E 阝 | 几而耳尔二 | 髒耍垩示兀 |
| F 犭几 | 乏凡方飞韭丰夫弗甫阜 | 风韭契寿邦春 |
| G 壮止皿艮 | 甘戈个艮弓瓜广龟果更工丐鬼癸 | 共骨竹垦即张引弱麻敢 |
| H 一 卢里 | 黑亥禾乎户互夹火函 | 百死不丙岁卤干夹天王兀<br>一下重再正五署虎 |
| I 朩乂(宀丁)(巳己) | 夷乙已义弋亦尹 | 杀瓦飞买卫才司习导忌式贰 |
| J 纟钅乏彡隹类 | 开击及几己脊夹甲戈束见巾斤今荨井<br>九久旧臼具金 | 建劲蝶卷果壶鼠毁舅灸 |
| K 手 | 可开口亏亢克 | 看拜哭吃吴 |
| L 亻艹芦丬自 | 来乐耒里立力吏隶良两了〇令龙 | 老者劳艨临师帅辛毅朗 |
| M 广尸夕毋 | 麦免面民皿末母木目马买毛矛么门米<br>羋卤麻黾 | 午乍缶卸年眉卯印贸郧留<br>贾麦札冈<br>革董歉鹊 |
| N 牛 艹 广 鸟 | 乃内鸟裘廿乜牛农女邵 | 革董歉鹊 |
| O 匚 | 区 | 臣巨 |
| P 丿 一 月 (刂寸申) 乀 | 乓皮片乓正平 | 儿龍么川写军壮北收藏蛋 |
| Q 圭(亜) | 七妻气千且丘求曲犬去其 | 青麦奥气秉奉秉舌禾重兵甚 |
| R | 冉人壬刃日入 | 坐合余佘仓 |
| S 彡孑冫 | 卅伞丧山上舌申身升生尸失十石史豕<br>士氏世事手书术戌束水厶司巳鼠爽叟 | 礼须带卡叔出乱尼克南卖拜<br>协贲直丧蘪朝嘉升允台参垒 |
| T 扌门士 | 太天头凸土兔屯毛 | 扎同冈用甩幸走 |
| U 丯丰丫囲 | 于予臾禺雨禹玉拳日月云 | 隶青勇甬牙奧愚露是冒畎 |
| V | (This is intented to be empty.) | |
| W 亠 毛 | 瓦丸万亡王韦为囗卫未我无毋五兀勿<br>戍午乌 | 文下玄产充高主衰夜亦武<br>囹国戌咸咸 |
| X 忄彐皿酉 | 夕西习系下乡小心戌血幸凶穴 | 寻录彖羲粤要夏夏空穷<br>名多学兴光少睾 |
| Y 氵艹美芏义 | 丫严央幺尧夭也业页臾永用尤九幽由酉又 | 著荞羞幻幼齿双圣 |
| Z 辶豕 罒 尤 夊 卜<br>癶 残 隶 | 丈爪光争正之止中重舟朱竹主专隹<br>子自至走足 | 乳爱左在炙占桌卓<br>义戚制孔子了串忠贲 |

*FIG. 5*

Radical Name Table

| | | | | | | | | |
|---|---|---|---|---|---|---|---|---|
| A | 冂(门) | 奥字头 | | 已己 | 已字形 | | 氵 | 三点水 |
| | 凵 | 凹字底 | J | 纟 | 绞丝旁 | | 饣 | 食字旁 |
| B | 丷 | 八字头 | | 钅 | 金字旁 | | | (shi4) |
| | 勹 | 包字头 | | 廴 | 建之旁 | | 豕 | |
| | 宀 | 宝字盖 | | 孑 | 颈字旁 | T | 扌 | 手字旁 |
| | 疒 | 病字头 | | 戠 | 戠字旁 | | 冂 | 同字框 |
| | 广 彡 | 髟字头 | | 卷 | 卷字头 | | 土 | 土字旁 |
| | 木 | 变字头 | K | 手 | 看字头 | U | 艹 | 幸字头 |
| C | 艹 | 草字头 | L | 冫 | 两点水 | | 予 | 予字头 |
| | 彳 | (chi4) | | 耂 | 老字头 | | 臾 | 奥字头 |
| | 虫 | 蟹字头 | | 劳 | 劳字头 | | 曰(日) | 日字头 |
| | 巛 | 巢字头 | | 褒 | 褒字头 | N | 亠 | 文字头 |
| | 屮 | 常字头 | | 临 | 临字旁 | | 弋 | 武字头 |
| D | 亻 | 单人旁 | | 朗(月) | 朗字旁 | | 囗 | 围字框 |
| | 夂 | 冬字头 | M | 每 | 每字头 | X | 忄 | 心字旁 |
| | 刀 | 刀字头 | | 厂 | 眉字头 | | 灬 | 小字头 |
| | 癶 | 登字头 | | 卯 | 卯字头 | | 彐(彑) | 寻字头 |
| | 盾 | 盾字头 | | (毋) | 母字形 | | 西 酉 | 西字形 |
| | 厂 | 厂字旁 | | 母 | | | 夏 | 夏字头 |
| | 阝 | 阝(du3)字旁 | | 牛 | 牛字旁 | Y | 言 | 言字旁 |
| E | 耳 | 耳朵旁 | | 廿(nian4)字头 | | | 芈 关 羊 | 羊字头 |
| F | 犭 | 反犬旁 | | 衤 | 衣字头 | | 又 | 又字旁 |
| | 几 | 凡字框 | | 鸟 | 鸟字头 | | 幺 | (yao1) |
| G | 廾 | 共字头 | O | 匚 | 区字框 | | 曳 | (ye4) |
| | 告 | 告字头 | P | 丿 | | Z | 辶 | 走之旁 |
| | 止 | | | 一 | 平宝盖 | | 豸 | 豸(zhi4)字旁 |
| | 骨 | 骨字头 | | 丬 | 爿字形 | | 爪 | 爪字头 |
| | 艮 | 艮(gen3)字形 | | 正 | 正字形 | | 左 | 左字头 |
| H | 一 | 横 | | 青 | 青字头 | | 炙 | 炙(zhi4)字头 |
| | 三 | 横三 | Q | 千 | 千字头 | | 占 | 占字头 |
| | 虍 | 虎字头 | | 曲(齿) | 曲字形 | | 黄 | 黄字头 |
| | 黑 | 黑字头 | R | 日 | 日字旁 | | 戒 | 戴字框 |
| I | 衤 | 衣字头 | | 人 | 人字头 | | 制 | 制字旁 |
| | 义 | 义(yi4)字形 | S | 纟 | | | 子 | 子字旁 |
| | 乙乚 | 乙字形 | | 示 | 示字头 | | | |

FIG. 6

CHINESE PHRASAL STEPCODE

BACKGROUND OF THE INVENTION

A regular printed basic unit of a writing system is a glyph. In English, a glyph is a letter or a punctuation mark. Any segment of written or printed discourse ordinarily appearing between spaces or between a space and a punctuation mark in English is a word. A word has unique semantics in English. A glyph in Chinese is shaped as a square unit. In Chinese, a glyph with unique semantics in written or printed discourse is a character, sometimes referred to as an ideographic symbol. A glyph without semantics with only one mark or dash made by a single movement of a writing device is a stroke. A radical is a partial character. Some glyphs of the same stroke pattern are both a character and a radical, where they differ only in the overall circumference, and are referred to as stand-alone radicals. A radical may contain other radicals; the contained radicals are sub-radicals. In English, the basic building block of the writing system is the letter, and there is only one way to lay it down in a discourse. In Chinese, the basic building block of the writing system is the character. With the number of characters well into the thousands, typing a discourse using several thousands of symbols is far more difficult than typing in English. So the problem is how to represent characters with a small number of symbols in a fixed order linearly, so that it becomes possible to use a keyboard with about 55 keys to produce a Chinese discourse. Since the American invention of the typewriter, there have been countless attempts to design a better linear form for Chinese characters, as in the paper *A Solution to the Ideographic Character Identification Problem*, by George K. Kostopoulos and the PINXX-IEE Formula, by Wen Tien.

In this document, a few conventions are used to describe a character. A pair of round parentheses, ( ), is used after each ideographic symbol to contain its pronouncation, with a digit in the pronouncation description to indicate its tone. For example, 马, (ma3), using the standard Pinyin pronunciation system with the third tone, Dip.

Three basic approaches are used in such a linear representation: phonetic based, stroke based and radical based. The phonetic approaches are mostly based on an existing phonetic standard, such as Pinyin system of Mainland China, Zhuyin system of Taiwan, Katakana of Japan. Although there are objections to such a standard pronunciation of a language, some computer software packages are able to feature some dialects based on the standard systems.

The stroke approach to Chinese character search is rooted in history. A basic stroke set contains 4 to 10 different stroke patterns, where each pattern is composed of one to three basic strokes. For example, U.S. Pat. No. 4,684,926 has used 5 single-stroke patterns, PINXXIEE has defined 10 single-stroke patterns, U.S. Pat. No. 4,500,872 has used the Four Corner Code definition, which includes 4 single-stroke, 4 bi-stroke and 3 tri-stroke patterns. The standards are merging to 5 Stroke code and Four Corner Code.

For whatever representation methods are used, one fundamental question which cannot be avoided is how to break characters down into a manageable radical set. The stroke based methods have to deal with the issue, to make it is possible to organize many combinations of strokes. The phonetic based method has to deal with the issue to discriminate among homophones. Four problems are encountered in attempting to define a radical set. The first problem is how to decompose a character, that is, to decide which part of the glyph to consider as a building block, or root symbol. The second problem is to determine in what order these root symbols should be listed. The third problem is how to represent a root symbol and the fourth problem is deciding which parts of the representation to use in the encoding.

A typical radical set of an ordinary dictionary may include a single stroke pattern set of 5, a multiple stroke pattern set of about 50-60 and stand-alone radical set of 200-250, which totals to about 250-300 symbols. The majority of stand-alone radicals contain 4 or more single strokes. The U.S. Pat. No. 4,684,926 has devised two levels of radicals, the basic 5 stroke level and a root level. In the root level, four classes of radicals are defined: the key class has 25 stand-alone radicals, the stroke-root class has 44 members, the main-root class has 97 members and the derivative-root class includes 70 members. The total of the non-stand-alone radicals is about 120, which is twice as many as that of a typical dictionary. This is the reason for the shortened retention time and prolonged learning time for persons using the encoding system.

Conventionally, three objectives have directed efforts to achieve a satisfactory coding scheme. The first is to minimize the number of key strokes needed to express each ideographic symbol. The range of key strokes for each character is between 2 and 9. Two key strokes per character is readily attainable by trained operators. The second is to assure that no code sequence represents more than one ideographic symbol. The resulting encoding methods are often such that the shorter the average code length, the more encrypted the code, so that retention in human memory over time is poorer, as in the case of U.S. Pat. Nos. 4,379,288, 4,531,119, 4,684,926 and The Natural Code.

Since the first two objectives will produce encoding schema with shorter retention times, the third objective has been emphasized: make the coding rules simple. The simpler the encoding rules are, the longer the retention time will be. The more easily learned methods often can be retained longer in human memory, as in U.S. Pat. No. 4,872,196 and other phonetic based encoding, but each of the frequent occurrences of homophones requires the operator to stop typing and look for the correct character or word on the screen. After finding the desired symbols, the operator may either type the next key, or use a pointing device to select the correct entry from the screen. These incidents of typing—visual searching—selecting from the screen either with a pointing device or by typing the code are called session switches. The operator often has to type and select to choose the fight symbols, as is the case in U.S. Pat. No. 4,531,119. Another way to gain longer retention time is to design the key layout in a logical fashion, such as the effort made in U.S. Pat. No. 4,684,92.

Observing that frequent session switches reduces the speed of typing, the inventor introduces the fourth objective: minimize session switches in an encoding system. This objective has been used for Chinese dictionary indexing. For example, stroke number based indexing and phonetic based indexing are used in regular dictionaries. Stroke based indexing requires the operator to count the number of strokes. It is slow and inconsistent due to different ways of writing a character.

Phonetic based indexing has very frequent session switches due to homophones, which U.S. Pat. No. 4,531,119 uses visual selection from the screen to resolve.

It is also noticed that all the prior encoding methods are based on coding one character at a time. U.S. Pat. No. 4,684,926 claims to include phrasal encoding, but its primary coding method is based on individual characters, and its phrasal encoding is extracted from its character encoding, and is limited to a small number of preselected frequently used phrases.

SUMMARY OF THE INVENTION

A phrase is a character sequence which is naturally used as a group in the corresponding spoken language. For example a phrase can be: a single character, ex. 食 (shi), a longer sentence fragment, ex. 一石二鳥 (Kill two birds with one stone), or a short sequence, ex. 好吗 (How do you do.) The boundary may be somewhat arbitrary, often depending on the writing style of the user, as is the case in the English example: an easy-to-read document. Phrasal StepCode codes phrases one at a time as they naturally occur in the spoken language. It is designed for the computer to process the information about the desired phrase in four distinct steps. At each step, the system conducts a dictionary search. As soon as a unique phrase is identified in one of the steps, the rest of the steps become unnecessary and are skipped. If a phrase exists in the dictionary, then it is likely that the first one or two steps will be sufficient. If a phrase does not so exist, then sufficient steps would be used to identify the individual characters in the phrase. Once the individual characters of a phrase are confirmed, the character sequence can be saved in the dictionary for future references. Thus, while the operator is typing a Chinese discourse, the system is building up the user's dictionary, so that future searches will be limited to one or two steps.

The first step is a phonetic description of the phrase, using the Roman alphabet. Mainland China standard Pinyin is used to label the phrase for mainland China users. The Zhuyin standard may be used for Taiwan users, and Katakana may be used for Kanji users.

The second step is a tonal description of the phrase using one numeric digit for each character in the phrase. Thus, Women is the result of the first step, and Women32 is the result of completing the second step, as shown in FIG. 1.

The third step is a phonetic description of radicals of the phrase, using the Roman alphabet. A radical is one part of a character. If the radical is a stand-alone radical, then its name is readily available. If the radical is not a stand-alone radical, then its conventional name is used. Conventional names are listed in FIG. 6. In the above example, Wo has only one radical, which is a stand-alone radical, 我, and 们 (men2) has two radicals: 亻(danliren) and 门(men2), where 门 (men2) is also a stand-alone radical. The coding would be the first letter in the name of the first radical, as W for Wo, and D for the top-left, the first, radical, 亻(danliren). The result of completing the third step of the example is Women32wd.

The last step is a stroke description of the bottom right corners of the characters in the phrase using numerical digits. This numerical digit assignment is adopted from the Four Corner Code, which uses 10 stroke patterns, as shown in FIG. 3. The final Phrasal StepCode for the above example is Women32wd52.

BRIEF DESCRIPTION OF THE FIGURES

The features of the present invention may be best understood by reference to the following description, taken in connection with the accompanying drawings in which:

FIG. 4 is the standard Pinyin symbol table, which provides the content of step 1.

FIG. 5 is the table of the radical groups which are labeled by the first letter of the radical's name and used in step 3.

FIG. 6 is the table of names used for non-stand-alone radicals.

DETAILED DESCRIPTION OF THE PREFERRED EMBODIMENT

Phrasal StepCode is a method which uses multiple kinds of information pertaining to Chinese characters. The information is assembled through a holo-code design, that is, a design in which many different aspects of characters are considered and used to achieve a better character discriminating ability. The kinds of information should be as orthogonal as possible, in the sense that each should be essentially independent of the others. Selection and assembly of these kinds of information in the past has already yielded over 500 different coding schema. Due to the complexity of the resulting coding schema and incompatibilities in existing designs, the guidelines for Phrasal StepCode design are: a) to use existing standards as much as possible and to avoid any new rule creation, even if that sacrifices opportunities to raise the information density in the code; b) to design the interface between the operator and the computer as rigidly as possible, even if a perfect holo-code scheme cannot be achieved. In other words, the Phrasal StepCode is a holo-code but not a perfect holo-code. It is an innovative coding scheme, using only the most orthogonal standards. To mend the holes left by the above two design rules, the Phrasal StepCode incorporates context information, for example the information provided by phrases. As described in FIG. 1; the components of the Phrasal StepCode are in a fixed order, which models the conventional form of a dictation session. First a phrase is heard. Second, the tones may or may not be noticed. If there is difficulty in recognizing a character, then, third, the dictator would be asked to describe the radicals of the character. Fourth and last, the dictatee looks at the finished characters and does a quick verification with a visual match. The top row of FIG. 1 describes source information pertaining to a phrase. The second row is the Phrasal StepCode for the said phrase, and the third row explains the components.

In the first component of the Phrasal StepCode standard Pinyin, as shown in FIG. 4, is used without mention of the tone of the individual characters, and without any blanks between characters. This is due to the fact that, when speaking, one would not always pause between the characters in a sentence. In Phrasal StepCode, the Pinyin standard of Mainland China is designated as the phonetic component, represented with the Roman alphabet. Uppercase letters are used for proper nouns, as is the convention in English. Alternative standards may be used for the Chinese language, as there are at least five standards in practice, which are shown in *A Dictionary of Chinese Character Information*.

Figures 1, 2, 3:
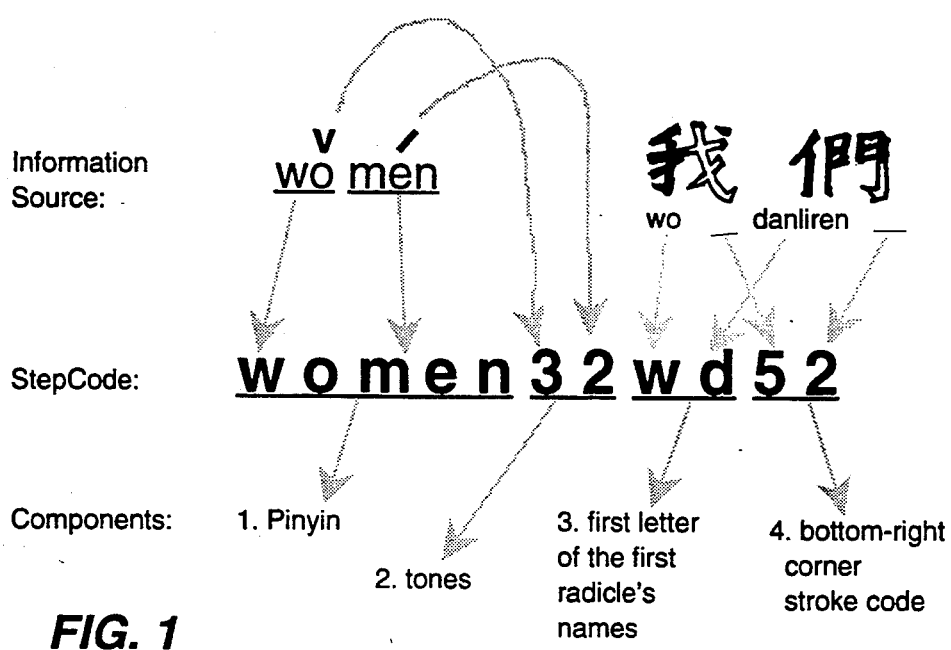
FIG. 1 is the Phrasal StepCode composition.
FIG. 2 is the numerical value and assigned tonal information, which is used in step 2.
FIG. 3 is the Four Corner Code table used in step 4.

Tonal marking in a dictation session is an afterthought for those who are interested. They are not needed until a phrase has been spelled out in Pinyin. FIG. 2 describes the numerical tonal assignment extended from the Pinyin standard. Tones 1, 2, 3, 4 are used in Mandarin as shown in FIG. 4. Tone 0 serves as a tone filler without specifying the accrual tone. Tone 5, ʼ Entering and tone 6, ~, Trill are for pronunciation in Cantonese or other applicable languages. Tones 7-9 are reserved for future development. As a basic rule, there is one tone for each Chinese character, unless other linguistic rules are already in place. For example: 七人 (hualer0) are two characters. But they are spelled as Huar in Pinyin, due to a special omitting rule. To be consistant with Pinyin, the Phrasal StepCode for 七人 would be (haur1), instead of (huaer10).

The third Phrasal StepCode component is based on the radicals of characters. Four issues are of concern: 1. in what order the radicals are counted; 2. which radicals are counted and in what case; 3. what name is used for a radical; 4. how the radicals groups are classified.

The order of radicals in a character often follows three main rules in the following precedence: top-down, left-right and outside-inside. Sometimes the radicals in a character can be listed in more that, one way. For example, 豢 (meng4), has three radicals 木木夕. Using the above rules, the radical order would be 木夕木 (mu4 xi1 mu4), instead of 木木夕ʼ (mu4 mu4 xi1). The latter order is more consistent with the conventional order of writing the characters. Often not all of the radicals of a characters are used to code the character. Typically, 2 or 3 of them are needed. If there are not enough radicals, the empty radical has to be made to fill. The radicals used in the encoding system are called key radicals. Even only one key radical is involve, as is the case in deriving a key radical for the character in regular dictionaries, there are still several conflicting choices. For example for 闷(men4), some use the 门ʼ(men2) as the key, some use the 心(xin1) as the key. In phrasal StepCode, the only radical used is the upper-left radical, or the first radical of writing order. The latter is used as confirmation of the earlier. For example, in the case of character 花 (hua1), use the radical ⺿(caozitou) and in the case of character 长 (chang4), use the radical 门ʼ (ko3).

As pointed out in the background section, there are various ways to decompose and classify radicals. The most authoritative publications do not agree on all aspects of such matters, as shown in *A Dictionary of Chinese Character Information*. The use of radicals and subradicals is arbitrary in different decomposition schema. In Phrasal StepCode, the principle is to follow the general pattern of oral communication. The three cases are:

a. A character may be divided into two to four radicals. No radical should contain any stroke crossing another radical. If there is more than one way to derive the radicals, take the division with the smaller number of radicals. For example, 乔(qiao1) is a two radical character: 乔 乔, rather than four: ⌐口冂丄, so the key radical is 乔(gao1). FIG. 5 is a list of radical groups and their keys, where most of the inconsistencies may arise. Although the list is not exclusive, it contains about 600 frequently used characters, which are stand-alone radicals, a few radical patterns derived from the named radicals and examples of characters where the radicals would appear. These sample characters are meant to illustrate cases about which questions are likely to occur. Thus for the regular case, 鹰(ying1), has two radicals: 應(ying1) and 鸟(niao3), and 貝 (bei4) is a sub-radical with lower priority and the key radical is 應(ying1) instead of 貝(bei4); even 鹰 (ying1) is not in the name table. If the character is 鹰(ying1), then the radicals would be 貝貝女 (bei4 bei4 nü3), and 貝 (bei4) would be the key radical.

b. If a radical is not a character and has no given name in the radical name table in FIG. 6, but the subradical at the top-left location of the top-left radical is a stand-alone radical, then the stand-alone subradical is the key radical character. For example, 攀(pan1) can be considered as three radicals from top-to-bottom: 爻大手. Since the first radical 爻 is not a stand-alone radical, and is not listed in the radical group in the radical table of FIG. 5, but its sub-radical 木 (mu4) is a radical in the list, the key radical would be 木(mu4).

c. If a character does not admit a unique key radical derivation then it is treated as a stand-alone radical. For example, for 日 (han2), according to the key radical definition, it is arguable that either 丁 or 凵 could be the key, so the whole character is the key and H is the code for the third component. Other examples may be 奂義双 (yang1 yi2 shuang3). Conventionally, they are classified into the group, 大 (da4). Since the features of the shape of 大 do not quite match the top-left radical position rule, and can be confused with the radical 十 (shi2), they are treated as self-named radicals.

The non-stand-alone radical names are mainly based on the names used in 辞海 Cihai, 1980, with a few minor modifications. The final version is shown in FIG. 6. Only the first letter of a radical's name is used into the coding, even with double letter consonants, such as ZH, CH, SH, for which only Z, C or S are in the name table. The names of the groups follow Pinyin standards with two modifications: the radical names with Yi and Yu(ü, üe, ün) are pronunced as [i] and [y] and are classified under I [i] and U [y] instead of Y. The derivation is based on the International Phonetic Alphabet standard.

The radicals are classified into 25 groups according to their names as shown in FIG. 5. A few radicals have variation patterns listed in a pair of round parentheses, ( ). These variations are named after their leaders instead of themselves. For example: 乙(yi3) 丨乚 includes a single stroke with turning patterns, The table of Phrasal StepCode radical groups in FIG. 5 includes the majority of stand-alone radicals of the GB character set.

The fourth component of Phrasal StepCode is based on the Four Corner Code method shown in FIG. 3. The coding rules have been modified by Xiandai Hanyu Cidian and they are used in the documented encodings. Only the fourth corner code of each character is used in the Phrasal StepCode, so the coding rule is simple for ordinary users. Other variations for each implementation are not excluded.

To use a popular measure, on the average 4-5 keystrokes per character will be sufficient to input a Chinese discourse. Without typing session switches, the typing speed will resemble the speed of English typing. The complete Phrasal StepCode has 5-9 keys for each character. It is necessary to use the complete code forms only when the desired characters are not commonly used in a phrase. In this case, it is necessary to introduce two more measures: character hit rate and character search termination factor.

Character hit rate is the ratio of the number of characters with a unique encoding to the total number of characters in the database. For characters with a unique encoding, only one search by the computer is required to either find the character or to determine that its code is not in the set. For example, the GB standard of Mainland China is an encoding with a hit rate of 100%.

If any code sequence represents several data items, in this case several characters, a 100% hit rate is impossible. Also, a legal code sequence may correspond to a character which is not in the database. We would like to predict how many searches will be needed to either find the character in the database or to report that the character is not there. The search termination factor is used to predict how efficiently the system will perform when the above two cases can occur. The search termination factor is a function of the size of the data base with respect to the number of searches needed on the average to terminate a search.

The search termination factor is defined as the average of the reciprocals of the numbers of search steps needed to terminate a search in the database, and is denoted by St. Let E be the total number of data items in the database, let $\alpha$ be a number of search steps, and let $E_\alpha$ be the number of data items requiring $\alpha$ search steps before the search for the item terminates. Then $$St=(1/E)\Sigma(E_\alpha/\alpha)=\Sigma(E_\alpha/E)/\alpha$$

For example, a database system normally consists of several data tables and three searches are usually needed: the first to find the right data table, the second to locate the row with the data item, and the third to find the data item within its row. If there are 5 tables with 1000 entries (rows) each, and each entry has 4 data fields, then $E=5\times1000\times4+5000+5=25{,}005$, and the character search termination factor is $$St = \frac{5/25.005}{1} + \frac{5000/25.005}{2} +$$
$$\frac{20.000/25.005}{3} \approx 0.0002 + 0.1 + 0.27 \approx 0.37$$

If it is assumed that the operator interacting with the data base system gives the perfect index keys to the database, such as 2.0300.0, where each number denotes the key for each search, then the hit rate will be 100%, with $St=(25{,}005/25{,}005)/1=1$.

Figure 7:
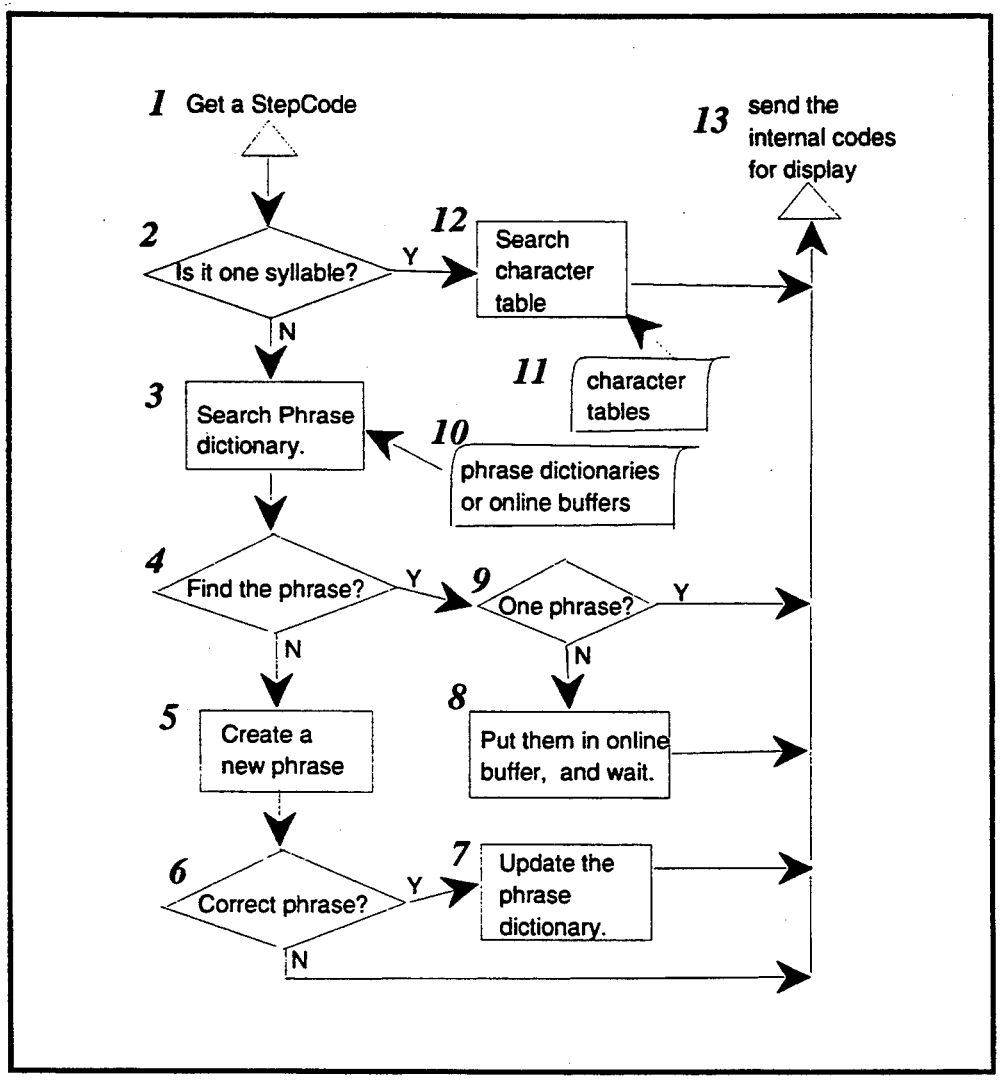
FIG. 7 is the flow chart for Phrasal StepCode input processing at each dictionary search with each step of the code typing. The decision box 6 is to determine if there is any error in the user's typing. If there is no error, then the new phrase is approved by the operator and the phrasal dictionary is updated.

It is meaningful to use the search termination factor as a measure of the efficiency of an encoding scheme. For the proposed method, depending on the system implementation, the character hit rate is at least 85% for the GB character set. The non-hit characters are characters which are homophones and have identical key radicals, resulting in their having the same encoding. For example 英英英 (ying2 ying2 ying2). Such characters are called homocharacters. Codes representing homocharacters are called poly-codes. In its current implementation, which has a 91% hit rate, the documented encoding system has 295 poly-codes representing the 9% of the GB character set which is homocharacters (about 620 characters). The characters associated with a poly-code are called the members of the poly-code. In the implemented system, the numbers of members of the poly-codes range from 2 to 4, so the maximum is 4. It is reasonable to display the 2-4 characters on the screen for the operator to select from. As has been mentioned, this case occurs only when the characters are not likely to be used in a phrase. Characters falling into this case are likely to be the least frequently used characters in the GB group II character set, and total about 4% of the entire character set. The other homocharacters, about 5% of the entire character set, can be resolved by pre-stored phrases in a phrase dictionary, as shown in FIG. 7 box 2, 3. In summary, the search termination factor of the present encoding system is:

$$St=(6165/6783)/1+(338/6783)/1+(280/6783)/2\approx 0.98$$

FIG. 7 is the flow chart for processing Phrasal StepCode, where boxes 2, 4, 6 and 9 indicate decision points in the system. Three paths through the system will yield the correct ideographic symbols, as shown by boxes 7, 9 and 12. Box 12 is compatible with existing character searching methods. Box 11 is an information exchange table containing at least one standard information exchange code and Phrasal StepCode. Box 10 represents digital dictionaries containing general vocabulary, professional vocabulary and user defined vocabulary. The buffer is used while the operator is typing to hold information related to the phrases being processed. Box 7 is the dictionary update procedure, which indicates the expansion capacity of the system. Box 8 indicates that the next component of the Phrasal StepCode is needed.

The Phrasal StepCode is not encrypted. It is readable without reference to the ideographic symbols, so that it can be used in its original format for communication and programming without the burden of carrying another operating system such as CCDOS. It is easy to learn, since it uses well-defined simple rules, which closely resemble the spoken language. With the Phrasal StepCoding, shorthand input methods for frequent users are not excluded. For example, the S key could be used to represent the three-key sequence ANG. It can be compatible with an existing phonetic based input system, and incorporate any existing technologies. Rooted in the results of centuries of language research, the Phrasal StepCode method provides a dynamic knowledge expansion feature as box 7 in FIG. 7 shows, and it provides a basic model for further ideographic language computer processing.

I claim:
1. An encoding system for an ideographic language, which consists a set of ideographic symbols or ideograms, comprising:
   means for representing the pronunciations of the ideograms as said encoding system's pronunciation component;
   means for representing different tones of the pronunciations as said encoding system's tone component;
   means for representing graphical patterns of the ideogram as said encoding system's radical components; and means for representing a stroke or strokes of the ideogram as a candidate feature of said encoding system's supplemental component;

wherein said ideogram or a plurality of ideograms are represented as an alphanumerical string not containing any blank, where said alphanumerical string contains a string pattern or a plurality of string patterns, where each of the string patterns is a string of alphabets followed by a numeral or a plurality of numerals, where the number of numerals indicates the number of ideograms represented by said alphanumerical string.

2. The encoding system of claim 1, wherein the pronunciations of the ideograms are defined by an existing authoritative agent of the ideographic language and published as part of a standard phonetic system of the ideographic language and represented by alphabets.

3. The encoding system of claim 2, wherein the different tones of the pronunciations are defined by the same or equivalent standard phonetic system and represented by numerals.

4. The encoding system of claim 1, wherein the graphical patterns of the ideogram are defined by an existing authoritative agent of the ideographic language, published as part of reputable dictionaries of the ideographic language, referenced by pronunciations of the radicals, and represented by alphabets.

5. The encoding system of claim 1, wherein the stroke or strokes of the ideogram are defined by an existing publication'including a dictionary or a text book of the ideographic language, and represented by numerals.

6. The encoding system of claim 1, wherein the supplemental component are defined by one of the characteristics of the ideograms which is not duplicated in other components of said encoding system and represented by numerals.

* * * * *